United States Patent
Gummuluri et al.

(10) Patent No.: US 8,504,469 B2
(45) Date of Patent: Aug. 6, 2013

(54) DETECTING CREDIT MISUSE

(75) Inventors: Sreedevi Gummuluri, Charlotte, NC (US); Yanghong Shao, Charlotte, NC (US); Debashis Ghosh, Charlotte, NC (US); Sudeshna Banerjee, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 384 days.

(21) Appl. No.: 12/705,770

(22) Filed: Feb. 15, 2010

(65) Prior Publication Data

US 2011/0202436 A1 Aug. 18, 2011

(51) Int. Cl.
*G06Q 40/00* (2012.01)

(52) U.S. Cl.
USPC ............ 705/38; 705/37; 705/35; 705/30; 705/39; 705/40; 705/43; 379/201.12; 379/114.1; 379/114.12; 379/114.13; 707/769

(58) Field of Classification Search
USPC ......... 705/38, 37, 35, 39, 30, 40, 43; 707/769
See application file for complete search history.

(56) References Cited

U.S. PATENT DOCUMENTS

| | | | | |
|---|---|---|---|---|
| 2002/0123962 A1* | 9/2002 | Bryman et al. | ............ | 705/39 |
| 2002/0138409 A1* | 9/2002 | Bass | ............ | 705/38 |
| 2002/0152155 A1* | 10/2002 | Greenwood et al. | ............ | 705/38 |
| 2004/0054619 A1* | 3/2004 | Watson et al. | ............ | 705/38 |
| 2005/0165680 A1* | 7/2005 | Keeling et al. | ............ | 705/40 |
| 2006/0271456 A1* | 11/2006 | Romain et al. | ............ | 705/35 |

OTHER PUBLICATIONS

The payroll card payoff: employees and retailers can benefit from this form of payment.(Food Forum); Ahmad, Farhan Grocery Headquarters, v 75 , n. 3 , p. 14(1); Mar. 2009.*
The Information Content of Equity REIT Bank Credit Facility Announcements; Campbell, Robert D; Devos, Erik; Spieler, Andrew C; Journal of Real Estate Portfolio Management v14n1 pp. 1-5; Jan.-Mar. 2008.*
Utility U.S. Appl. No. 12/473,635, filed May 28, 2009.
Utility U.S. Appl. No. 12/486,464, filed Jun. 17, 2009.

* cited by examiner

*Primary Examiner* — Tien Nguyen
(74) *Attorney, Agent, or Firm* — Michael A. Springs; Moore & Van Allen PLLC; Tracea L. Rice

(57) ABSTRACT

Behavior associated with credit misuse is referred to herein as "intentional misuse of credit" (IMOC) behavior and individuals who exhibit IMOC behavior are referred to herein as IMOC individuals. Embodiments of the present invention provide systems, methods, and computer program products for reviewing, on a daily basis, financial-transaction data taken across a plurality of individual consumers, identifying individual consumers whose financial-transaction data indicates IMOC behavior, and flagging those individual consumers as IMOC individuals. To enhance financial institutions' ability to make accurate credit-approval decisions, other embodiments of the present invention provide systems, methods, and computer program products for reviewing a particular credit applicant's most recent financial-transaction data and, based thereon, determining whether that credit applicant, who otherwise has a good credit history, exhibits recent IMOC behavior and thereby possesses the propensity to misuse the applied-for credit.

20 Claims, 9 Drawing Sheets

| | |
|---|---|
| MONTHLY CASH FLOW FOR INDIVIDUAL A — 204 | 202 |
| PAYROLL DIRECT DEPOSIT — 212 | 5000 |
| | |
| ADDITIONS TO CASH (INFLOW) | |
| TRANSFER FROM OTHER FINANCIAL INSTITUTIONS — 214 | 100 |
| OTHER DEPOSITS (DIVIDENDS AND INTEREST) — 216 | 400 |
| | |
| SUBTRACTION FROM CASH (OUTFLOW) | |
| MORTGAGE — 218 | 2500 |
| UTILITIES — 220 | |
|    ELECTRICITY — 222 | 100 |
|    GAS — 224 | 100 |
|    WATER/SEWER — 225 | 50 |
|    CABLE — 226 | 100 |
|    PHONE — 228 | 100 |
| INSURANCE — 230 | 150 |
| GROCERY — 232 | 400 |
| GAS — 234 | 200 |
| GYM — 236 | 50 |
| INVESTMENT ACCOUNT** — 238 | 1000 |
| OTHER DEBT (CREDIT CARD, STUDENT LOANS) — 240 | 200 |
| | |
| CASH FLOW FOR EOM JAN 2007 — 213 | 550 |

208 { ADDITIONS TO CASH (INFLOW) rows }
210 { SUBTRACTION FROM CASH (OUTFLOW) rows }
206 { entire value column }

FIG. 2

| INFLOW TRANSACTION SUMMARY DATA | OUTFLOW TRANSACTION/SPENDING REPORT SUMMARY |
|---|---|
| | HIGHER LEVEL CATEGORIZATION |
| PAYROLL DEPOSITS | CHECKS WRITTEN — 314 |
| SOCIAL SECURITY DEPOSITS | ELECTRONIC PAYMENTS FROM CHECKING — 316 |
| TRANSFER FROM OTHER FINANCIAL INSTITUTION | CREDIT CARD SPENDING — 318 |
| OTHER DEPOSITS | DEBIT CARD SPENDING — 320 |
| | BILL PAY SPENDING — 322 |

| CONSUMER | CONSUMER CC ACCOUNT | | CONSUMER DC ACCOUNT | | CONSUMER DD ACCOUNT | | CONSUMER IL ACCOUNT | | CONSUMER LOC | | CONSUMER SAV | |
|---|---|---|---|---|---|---|---|---|---|---|---|---|
| | BEFORE | AFTER | BEFORE | AFTER | BEFORE | AFTER | BEFORE | AFTER | BEFORE | AFTER | BEFORE | AFTER |
| 1 | 1 | 1 | 0 | 0 | 0 | 0 | 0 | 1 | 1 | 1 | 0 | 0 |
| 2 | 2 | 1 | 0 | 1 | 0 | 0 | 0 | 0 | 0 | 0 | 0 | 0 |
| 3 | 1 | 1 | 0 | 0 | 1 | 1 | 0 | 0 | 0 | 0 | 0 | 0 |

| CONSUMER | BUSINESS CC ACCOUNT | | BUSINESS DC ACCOUNT | | BUSINESS DD ACCOUNT | |
|---|---|---|---|---|---|---|
| | BEFORE | AFTER | BEFORE | AFTER | BEFORE | AFTER |
| 1 | 0 | 1 | 1 | 0 | 1 | 0 |
| 2 | 0 | 2 | 0 | 1 | 0 | 1 |
| 3 | 0 | 1 | 0 | 0 | 0 | 0 |

600 — 604, 608 (608a/608b), 612 (612a/612b), 616 (616a/616b)

DETECTING CREDIT MISUSE

FIELD

In general, embodiments of the present invention relate to systems, apparatuses, methods, computer program products, and other tools for detecting credit misuse.

BACKGROUND

Credit misuse costs financial institutions billions of dollars each year. One exemplary type of credit misuse occurs when an individual consumer draws down a line of credit with intent to defraud the financial institution by not repaying the "borrowed" money. For example, when perpetrating this type of credit misuse, to ostensibly appear as a creditworthy consumer, the individual consumer builds a good credit score by exhibiting good credit behavior for an extended period of time. Relying on the good credit score, the individual consumer obtains lines of credit, e.g., credit cards, personal loans, and business loans, and then draws down the approved credit with no intention to ever repay the money. The individual consumer may not necessarily draw down the credit immediately after the credit is approved, but, when the individual does drawn down the credit, to avoid detection, the individual draws down the credit in a short period, e.g., less than four months. Oftentimes, individual consumers perpetrating this type of credit misuse draw down credit by taking large cash advances.

Because individual consumers who perpetrate this type of credit misuse typically have good credit histories and credit scores at the time they apply for credit and because these individuals utilize most or all approved credit within a short period, historical information provided in traditional credit reports is too dated to be useful for detecting the fraudulent nature of these individuals' financial transactions before the individuals draw down the credit. Traditional credit reports are based on information that is at least a month old. For example, to generate traditional credit reports, consumer reporting agencies ("CRAs") collect—on a monthly basis—personal and financial information about individual consumers and update each individual's credit report to include information from the previous month.

More specifically, CRAs collect personal and financial information about individual consumers from a variety of sources called data furnishers. These data furnishers are typically institutions that have had financial relationships with individual consumers. For example, data furnishers may be creditors, lenders, utility companies, debt-collection agencies, government agencies, and courts. Data furnishers report data regarding individual consumers to CRAs on a monthly basis, and, based on the received data, CRAs generate a credit report or update an existing credit report for each individual consumer.

A typical credit report contains detailed information about an individual consumer's credit history, including credit accounts and loans, bankruptcies, past due payments, and recent inquiries. A typical credit report also contains credit-utilization information, which indicates the percentage of approved credit an individual has actually used. Individuals utilizing a high percentage of their approved credit are generally more risky than those utilizing a low percentage. Also, a typical credit report contains a credit score, which, as mentioned above, reflects an individual consumer's creditworthiness. CRAs typically calculate creditworthiness scores on a monthly basis using the information provided by data furnishers.

Because credit reports, including creditworthiness scores, are updated on a monthly basis, individuals who draw down credit in a single month may avoid detection. For example, during the month an individual perpetrating the above-described type of credit misuse draws down most or all available credit, that individual's credit report may indicate low credit utilization and timely payment histories. Not until a month after the individual has exhausted lines of credit will that individual's credit report indicate high credit utilization, and not until several months after the individual has stopped making payments will that individual's credit report indicate missed payments. Accordingly, there is a need for systems, devices, methods, computer program products and other tools that identify transactions predictive of credit fraud and that enable financial institutions to utilize proactive measures to thwart fraudulent schemes and reduce losses resulting from credit fraud.

BRIEF SUMMARY

Behavior associated with credit misuse is referred to herein as "intentional misuse of credit" (IMOC) behavior and individuals who exhibit IMOC behavior are referred to herein as IMOC individuals. Embodiments of the present invention provide systems, methods, and computer program products for reviewing, on a daily basis, financial-transaction data taken across a plurality of individual consumers, identifying individual consumers whose financial-transaction data indicates IMOC behavior, and flagging those individual consumers as IMOC individuals. To enhance financial institutions' ability to make accurate credit-approval decisions, other embodiments of the present invention provide systems, methods, and computer program products for reviewing a particular credit applicant's most recent financial-transaction data and, based thereon, determining whether that credit applicant, who otherwise has a good credit history, exhibits recent IMOC behavior and thereby possesses the propensity to misuse the applied-for credit.

BRIEF DESCRIPTION OF THE DRAWINGS

Reference will now be made to the accompanying drawings to describe some embodiments of the invention, wherein:

FIG. 2 provides an exemplary cash-flow statement, in accordance with one embodiment of the present invention;

FIG. 3 illustrates categorization of inflows and outflows of a cash flow statement in accordance with an aspect of the invention FIG. 4 provides a flow diagram illustrating a process whereby an organization utilizes the concentration-risk modeling environment of FIG. 1 to calculate a redundancy score for a process within the organization, in accordance with an embodiment of the present invention;

FIG. 5 provides a table that lists three exemplary individual consumers that have intentionally misused credit and six consumer-account types, and provides indications of which consumer-account types each of the consumers had before and after booking an SMB account, in accordance with one embodiment of the present invention;

FIG. 6 provides a table that lists the three exemplary individual consumers that are list in FIG. 5, but, instead the six consumer-account types, the table of FIG. 6 lists three business-account types, and provides indications of which business-account types each of the consumers had before and after booking an SMB account, in accordance with one embodiment of the present invention;

DETAILED DESCRIPTION OF EMBODIMENTS OF THE INVENTION

Figure 1:
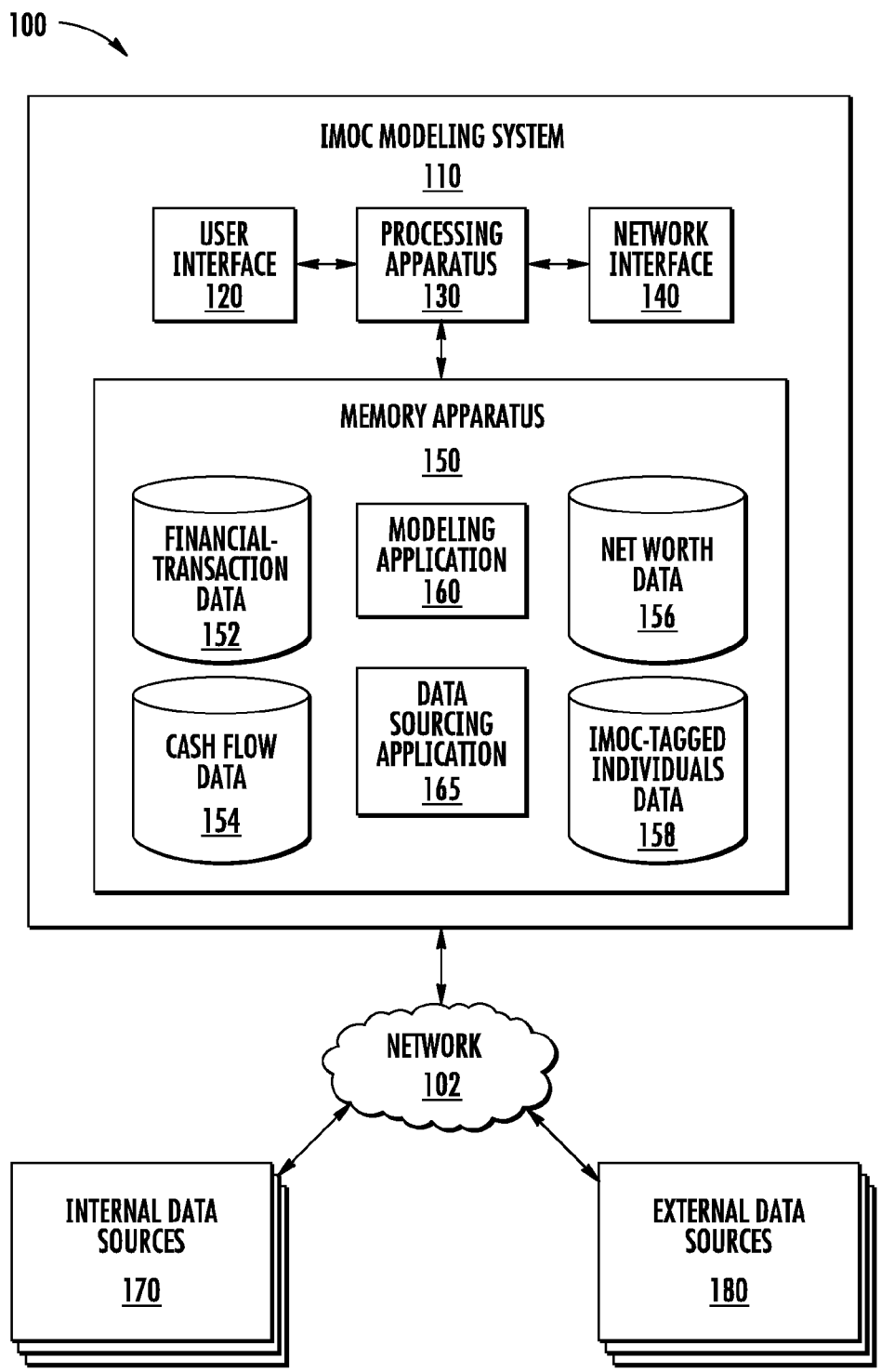
FIG. 1 provides a block diagram of an IMOC modeling environment in which the IMOC processes of the present invention are carried out, in accordance with one embodiment of the present invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of ordinary skill in the art in view of this disclosure, the present invention may be embodied as a method, system, apparatus, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-readable medium having computer-usable program code embodied in the medium.

Any suitable computer-readable medium may be utilized, including a computer-readable storage medium and/or a computer-readable signal medium. The computer-readable storage medium may be, for example but not limited to, a tangible electronic, magnetic, optical, electromagnetic, infrared, or semiconductor storage system, apparatus, or device. More specific examples of the computer-readable storage medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device. A computer-readable signal medium may include a propagated data signal with computer program instructions embodied therein, for example, in base band or as part of a carrier wave. Such a propagated signal may take any of a variety of forms, including, but not limited to, electro-magnetic, optical, or any suitable combination thereof. In the context of this document, a computer-readable medium may be any medium that can contain, store, communicate, and/or transport the program for use by or in connection with the instruction execution system, apparatus, or device.

Computer program code for carrying out operations of embodiments of the present invention may be written in an object-oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations, and/or combinations of blocks in the flowchart illustrations, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the flowchart block(s).

The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions/acts specified in the flowchart block(s). Alternatively, computer program implemented steps or acts may be combined with operator or human implemented steps or acts in order to carry out an embodiment of the invention.

Behavior that an individual consumer knows will result in credit misuse is referred to herein as "intentional misuse of credit" (IMOC) behavior and individuals who exhibit IMOC behavior are referred to herein as IMOC individuals. FIG. 1 provides a block diagram of an IMOC modeling environment 100, in accordance with one embodiment of the present invention. The IMOC modeling environment 100 generally includes an IMOC modeling system 110 in communication with one or more internal data sources 170 and one or more external data sources 180 via a network 102. The IMOC modeling system 110 comprises a user-interface apparatus 120, a network-interface apparatus 140, and a memory apparatus 150 operatively coupled to a processing apparatus 130.

As described in greater detail below, embodiments of the IMOC modeling system 110 are generally configured to review financial-transaction data taken from across a plurality of individual consumers to identify those individual's who exhibit IMOC behavior and tag those individuals as IMOC individuals. Further, as described in greater detail below, embodiments of the IMOC modeling system 110 are generally configured to model an individual consumer's financial-transaction data to identify whether IMOC behavior patterns exist and to determine whether the individual consumer is an IMOC individual. In this regard, according some embodiments of the invention, the IMOC modeling system 110 is owned, maintained, operated by, or operated on behalf of financial institutions that provide various forms of credit as well as checking and savings accounts to consumers. The IMOC modeling system 110 may, in some embodiments, be integrated with other systems of such financial institutions and may share at least some hardware, software, and/or other resources with such other systems.

It should be appreciated that the IMOC modeling system 110 may be owned or maintained or operated by a third party that provides IMOC information, such as a list of IMOC individuals, to subscriber financial institutions. It should also be appreciated that the IMOC modeling system 110 may be owned or maintained or operated by a third party for the purpose of making credit-approval decisions for subscriber financial institutions. For example, subscriber financial institutions may submit identifying information about an individual consumer along with information about the credit product for which that individual is applying, and the third party, using the IMOC modeling system 110, provides the subscriber financial institutions with credit-approval decisions.

As used herein, the term "apparatus" refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It will be understood by one of ordinary skill in the art that, although FIG. 1 illustrates the user interface 120, network interface 140, memory apparatus 150, and processing apparatus 130 as separate blocks in the block diagram, these separations may be merely conceptual. In other words, in some instances, the user interface 120, for example, is a separate and distinct device from the processing apparatus 130 and the memory apparatus 150 and therefore may have its own processor, memory, and software. In other instances, however, the user interface 120 is directly coupled to or integral with at least one part of the processing apparatus 130 and at least one part of the memory apparatus 150 and includes the user interface input and output hardware used by the processing apparatus 130 when the processing apparatus 130 executes user input and output software stored in the memory apparatus 150.

As will be described in greater detail below, in one embodiment, the IMOC modeling system 110 is entirely contained within a user terminal, such as a personal computer or mobile terminal, while, in other embodiments, the IMOC modeling system 110 includes a central computing system, one or more network servers, and one or more user terminals in communication with the central computing system via a network and the one or more network servers. FIG. 1 is intended to cover both types of configurations as well as other configurations that will be apparent to one of ordinary skill in the art in view of this disclosure.

The user interface 120 includes hardware and/or software for receiving input into the IMOC modeling system 110 from a user and hardware and/or software for communicating output from the IMOC modeling system 110 to a user. In some embodiments, the user interface 120 includes one or more user input devices, such as a keyboard, keypad, mouse, microphone, touch screen, touch pad, controller, and/or the like. In some embodiments, the user interface 120 includes one or more user output devices, such as a display (e.g., a monitor, liquid crystal display, one or more light emitting diodes, etc.), a speaker, a tactile output device, a printer, and/or other sensory devices that can be used to communicate information to a person. In one embodiment, the user interface 120 includes a user terminal that may be used by an employee of a financial institution that provides credit accounts, such as credit cards, small business or personal loans, and home equity loans, to individual consumers.

In some embodiments, the network interface 140 is configured to receive electronic input from other devices in the network 102, including the internal data sources 170 and the external data sources 180. In some embodiments, the network interface 140 is further configured to send electronic output to other devices in a network. The network 102 may include a direct connection between a plurality of devices, a global area network such as the Internet, a wide area network such as an intranet, a local area network, a wireline network, a wireless network, a virtual private network, other types of networks, and/or a combination of the foregoing.

The processing apparatus 130 includes circuitry used for implementing communication and logic functions of the concentration-risk modeling system 110. For example, the processing apparatus 130 may include a digital signal processor device, a microprocessor device, and various analog-to-digital converters, digital-to-analog converters, and other support circuits. Control and signal processing functions of the IMOC modeling system 110 are allocated between these devices according to their respective capabilities. The processing apparatus 130 may include functionality to operate one or more software programs based on computer-readable instructions thereof, which may be stored in the memory apparatus 150. As described in greater detail below, in one embodiment of the invention, the memory apparatus 150 includes a modeling application 160 and a data-sourcing application 165 stored therein for instructing the processing apparatus 140 to perform one or more operations of the procedures described herein and in reference to FIGS. 4 and 10. Some embodiments of the invention may include other computer programs stored in the memory apparatus 150.

In general, the memory apparatus 150 is communicatively coupled to the processing apparatus 130 and includes computer-readable storage medium for storing computer-readable program code and instructions, as well as datastores containing data and/or databases. More particularly, the memory apparatus 150 may include volatile memory, such as volatile Random Access Memory (RAM) including a cache area for the temporary storage of data. The memory apparatus 150 may also include non-volatile memory that can be embedded and/or may be removable. The non-volatile memory can, for example, comprise an EEPROM, flash memory, or the like. The memory apparatus 150 can store any of a number of pieces of information and data used by the IMOC modeling system 110 to implement the functions of the IMOC modeling system 110 described herein.

In the illustrated embodiment, the memory apparatus 150 includes datastores containing financial-transaction data 152, cash-flow data 154, net-worth data 156, and IMOC-tagged individuals data 158. According to some embodiments, for each individual consumer, the financial-transaction data 152 includes, for example, credit and debit card transactions, checking account transactions, electronic bill payment transactions, and demand-deposit (DD) account transactions. In some embodiments, the financial-transaction data 152 may be received from a user via the user interface 120, or may be obtained through electronic communication with another device, such as the internal data sources 170 or the external data sources 180, via the network 102 and utilizing the network interface 140, and then stored in the memory apparatus 150.

According to some embodiments, the cash-flow data 154 may include a cash-flow statement for each individual consumer, where the cash-flow statement may be calculated as the amount of cash receipts or inflows minus the cash payments or outflows over a given period of time. Cash-flow statements may be used to measure the financial strength or leverage of an individual consumer. An exemplary cash-flow statement 200 is provided in FIG. 2.

The cash-flow statement 202 of FIG. 2 represents the cash flow for an exemplary individual consumer, "Individual A" 204. As shown, the cash-flow statement 202 represents the amount of cash receipts or inflows 208 minus the cash payments or outflows 210 over a given period of time. A beginning cash flow 212 of $5,000 and an ending cash flow 213 of $550 are illustrated in cash-flow statement 202. In this example, the beginning cash flow 212 represents a payroll direct deposit for the consumer. The inflows 208, which are added to the beginning cash flow 212, include in this example a "transfer from other financial institutions" 214 and "other deposits (dividends and interest)" 216. The outflows 210, which are subtracted from the inflows 208, include in this example a mortgage payment 218 and various utility payments 220, such as an electric payment 222, a gas payment 224, a water/sewer payment 225, a cable payment 226, and a phone payment 228. Additional outflows 210 include an insurance payment 230, a grocery payment 232, a gasoline payment 234, a gym payment 236, an investment account deposit 238, and "other debt (credit card, student loans)" 240.

Those skilled in the art will realize that the inflows 208 and outflows 210 illustrated in FIG. 2 are merely exemplary and that numerous additional and different inflows and outflows are possible. For example, additional inflows may include salary checks, dividends, bonuses, and prize winnings, whereas additional outflows may include regular and intermittent bill payments. The cash flow statement 202 may be used to measure the financial strength or leverage of a consumer and make it easier to determine whether an individual consumer has a positive or negative cash flow. A positive cash flow for instance proactively indicates favorable financial health contrary to a negative cash flow. The larger the positive cash flow, the less likely an individual consumer will intentionally misuse credit.

As shown in FIG. 2, the exemplary individual consumer "John Doe" 204 has a positive cash flow of $550. Although John Doe's cash flow is positive, it is a relatively small amount, thereby indicating that John Doe is living just within his means. That John Doe is living just within his means is a factor to be considered, among others, when determining whether John Doe is an IMOC individual. For example, an individual living just within his means is more likely to be an IMOC individual that an individual who has large positive cash flow and is living well within his means. The individual with the relatively small positive cash flow would likely be more tempted to intentionally misuse credit than the individual who has a large positive cash flow and is living well within his means.

FIG. 3 illustrates categorization of inflows and outflows of a cash flow statement in accordance with an aspect of the invention. In FIG. 3, inflows 302 may be categorized into various groups such as payroll deposits 304, social security deposits 306, transfers from other financial institutions 308, and other deposits 310. Similarly, FIG. 3 illustrates that the outflows 312 may be categorized into various groups such as a checks written 314, electronic payments from checking 316, credit card spending 318, debit card spending 320, and bill pay spending 322. The various categories for both inflows 302 and outflows 312 may simplify the cash flow statements and provide information on various similar transactions so that additional analysis may be preformed. For example, as discussed in more detail below, when determining whether an individual consumer is an IMOC individual, it is helpful to know the individual's current and historical sources and amounts of income, types and amounts of credit the individual utilizes, and the types and amounts of expenses.

In some embodiments, the cash-flow data 154 may be received from a user via the user interface 120, or may be obtained through electronic communication with another device, such as the internal data sources 170 or the external data sources 180, via the network 102 and utilizing the network interface 140, and then stored in the memory apparatus 150.

According to some embodiments, the net-worth data 156 includes net-worth statements that are generated at an individual consumer level. A net-worth statement, for example, includes a listing of assets and liabilities of an individual consumer along with the calculated difference between the consumer's assets and liabilities. According to some embodiments, the net-worth statement indicates cash inflows that are directed to a particular financial institution as well as cash outflows that are directed to investments and savings accounts held at other financial institutions. The net-worth statement may also include attributes such as asset valuation based on dividend check deposits, amount directed into investment and brokerage accounts, and equity estimation in real estate.

The net-worth statements may provide an improved picture of individual consumers' financial positions. This improved picture is helpful when determining whether an individual consumer is an IMOC individual. For example, a monthly average of $550 in a checking account could mean that: (1) a consumer's real average balance is $550—this consumer may not be capable of repaying large cash advances; or (2) a consumer's average balance is $550, but they have investments and savings in other instruments/accounts located in other financial institutions as well as the current financial institution. In the first case, if the individual consumer takes a large cash advance that utilizes a large percentage of that individual's credit limit, then there is an increased chance that that individual is an IMOC individual. In the second case, the existence of additional investments and saving accounts at other financial institutions may indicate that the consumer has adequate resources to repay large cash advances taken against lines of credit.

In another aspect the invention, the net-worth statement may include dividend check deposits. Based on the amount of the dividend check, a calculation of the total amount of assets held by the individual consumer associated with the dividend check may be calculated. For example, if John Doe deposits a dividend check in the amount $750 from Company ABC, and if the ABC company has paid a 5% dividend to shareholders, then the amount of assets held by John Doe in Company ABC may be determined to be $15,000 worth of assets (e.g., stocks). This information may be used to determine the credit worthiness of an individual consumer. The net-worth data 156 may be received from a user via the user interface 120, or may be obtained through electronic communication with another device, such as the internal data sources 170 or the external data sources 180, via the network 102 and utilizing the network interface 140, and then stored in the memory apparatus 150.

According to some embodiments, IMOC individuals data 158 includes lists of individual consumers who have shown IMOC behavior in the past. The IMOC individuals data 158 may be received from a user via the user interface 120, or may be obtained through electronic communication with another device, such as the internal data sources 170 or the external data sources 180, via the network 102 and utilizing the network interface 140, and then stored in the memory apparatus 150.

For the sake of clarity and ease of description, the figures provided herein generally illustrate the financial-transaction data 152, the cash-flow data 154, the net-worth data 156, and the IMOC individuals data 158 as each being separate from one another. However, it will be understood that, in some embodiments, these datastores may be combined or the data described as being stored within such datastores may be further separated into additional datastores. For example, in some embodiments, the financial-transaction data 152 includes the cash-flow data 154 and the net-worth data 156 to combine summaries of individual consumers' cash flow and net worth with the actual transaction data contained in the financial-transaction data 152. Further, the financial-transaction data 152 may also include IMOC individuals data 158 to provide, in addition to cash-flow and net-worth summaries and transaction data, an indication of whether individual consumers have previously exhibited IMOC behavior.

In one embodiment, data within each of the four datastores shown in FIG. 1 may be linked to, and thus organized around, each of the individual consumers stored in the memory apparatus 150. In such case, a unique identification is assigned to each individual consumer. Thus, each of the unique identifications is linked within the memory apparatus 150 to the corresponding individual consumer's: (1) transaction data in the financial-transaction data 152; (2) cash-flow statements in the cash-flow data 154; and (3) net-worth statements in the net-worth data 156. If an individual consumer has a history of IMOC behavior, then that consumer's unique identification, according to some embodiments, is linked within the memory apparatus 150 to the appropriate list(s) of individual consumers in the IMOC individuals data 158. The unique-process identifications may be input by the user via the user interface 120, and may be stored by the processing apparatus 130 in any of the four datastores or in a separate datastore within the memory apparatus 150. Furthermore, the user may also create linkages in the memory device 150 between the unique identifications and the data within the four datastores utilizing the user interface 120, as described in detail below.

As further illustrated by FIG. 1, the memory apparatus 150 also includes a modeling application 160 and a data-sourcing application 165. As used herein, the term "application" generally refers to computer-readable program code comprising computer-readable instructions and stored on a computer-readable storage medium, where the instructions instruct a processor to perform certain functions, such as logic functions, read and write functions, and/or the like. In this regard, each of the modeling application 160 and data-sourcing application 165 includes computer-readable instructions for instructing the processing apparatus 130 and/or other devices to perform one or more of the functions described herein, such as one or more of the functions described in FIGS. 4 and 10. While the modeling application 160 and data-sourcing application 165 are drawn as separate applications within the memory apparatus 150, it should be understood that the functions of the two applications as described herein could be ascribed to a single application or more than two applications.

FIG. 1 further provides one or more internal data sources 170 and one or more external data sources 180 in communication with the IMOC modeling system 110 via the network 102. In some embodiments, the internal data sources 170 are databases within the network of computer systems of the financial institution utilizing the IMOC modeling system 110 to identify IMOC behavior and individuals consumers who exhibit IMOC behavior. The internal data sources 170 may contain data relevant to each of the individual consumers' transactions with the financial institution as well as information about each of the individual consumers provided from third parties, such as other financial institutions and/or data aggregators. In some embodiments, the internal data sources 170 may be certain databases maintained by the financial institution. In some embodiments, all or some of the internal data sources 170 may be the four datastores of the memory device 150, as illustrated in FIG. 1.

The external data sources 180 likewise contain data relevant to each of the individual consumers' transactions with the financial institution as well as information about each of the individual consumers provided from third parties, such as other financial institutions and/or data aggregators, however, the external data sources 180 are not located within the network of computer systems of the financial institution utilizing the IMOC modeling system 110 to model concentration risk. In some embodiments, both the internal data sources 170 and the external data sources 180 supply data to be relied upon by the IMOC modeling system 110 to carry out the various processes described herein.

Figure 4:
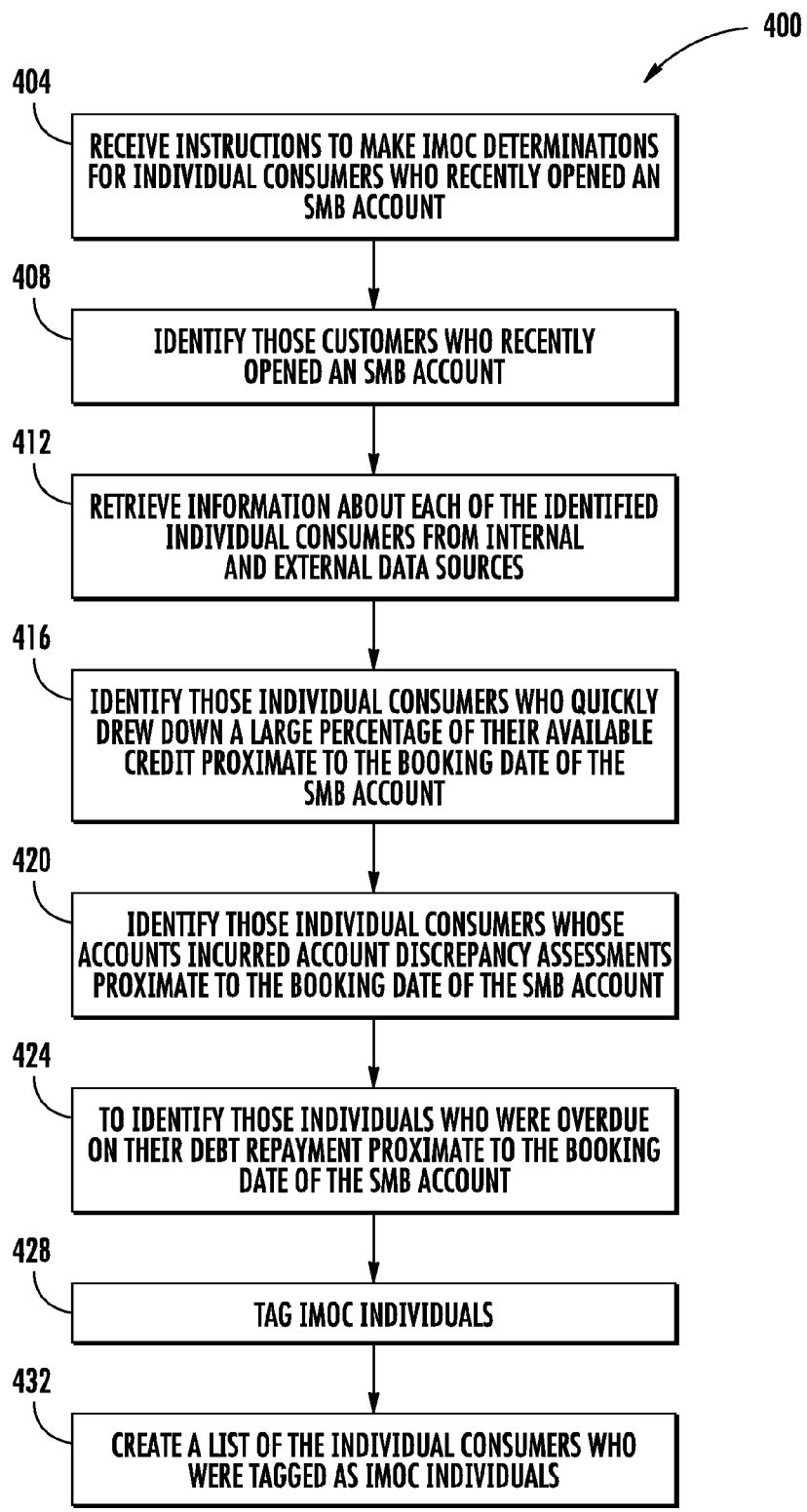

FIG. 4 provides a flow diagram illustrating an exemplary process 400 whereby a financial institution utilizes the IMOC modeling system 100 of the present invention to review all individual consumers whose information is provided in at least one of the internal data sources 170 and the external data sources 180 for the purpose of identifying and tagging as IMOC individuals those consumers who have intentionally misused credit in the past. For illustrative convenience, the exemplary process 400 will be described in the context of reviewing financial transactions of all individual consumers who have recently opened a small-and-medium-business credit-card account ("SMB account") with the financial institution to identify which of those consumers intentionally misused their SMB account.

As represented by block 404, according to some embodiments, the IMOC modeling system 100 receives an instruction via the user interface 120 to make an IMOC determination for each individual consumer that recently opened an SMB account with the financial institution. For example, the instruction may request that the IMOC modeling system make an IMOC determination for each individual consumer that opened an SMB account within the last year but more than three months ago. After receiving the instruction, the modeling application 160, as represented by block 408, instructs the processing apparatus 130 to identify those consumers who recently opened an SMB account with the financial institution. For example, the modeling application 160 may instruct the processing apparatus 130 to identify those consumers who opened an SMB account between three and twelve months ago.

As represented by decision block 412, once the individual consumers who recently opened an SMB account have been identified, the modeling application 160 instructs the processing apparatus 130 to retrieve information about each of the identified individual consumers from the internal and external data sources 170 and 180. For example, according to an embodiment, the modeling application 160 instructs the processing apparatus 130 to retrieve the identified individual consumers' financial-transaction data 152, cash-flow data 154, and net-worth data 156 from the datastores of the memory apparatus 150. More particularly, according to an embodiment, the modeling application 160 instructs the processing apparatus 130 to retrieve all of the identified consumers' financial-transaction data 152, cash-flow data 154, and net-worth data 156 for a six-month period, where the six-month period starts three months prior to the booking date of the SMB account and ends three months after the booking date of the SMB account. According to this exemplary embodiment, for a consumer who booked an SMB account on Apr. 1, 2009, the modeling application 160 instructs the processing apparatus 130 to retrieve all of the consumer's financial-transaction data 152, cash-flow data 154, and net-worth data 156 from Jan. 1, 2009 to Jun. 1, 2009 because January 1 is three months prior to the booking date of the SMB account and Jun. 1, 2009 is three months post the booking date of the SMB account. It should be appreciated that the modeling application 160 could instruct the processing apparatus 130 to retrieve the identified consumers' financial-transaction data 152, without retrieving the identified consumers' cash-flow data 154 and net-worth data 156, Before continuing with the exemplary process 400 of identifying and tagging as IMOC individuals those consumers who have intentionally misused credit in the past, the financial transactions of several exemplary individual consumers who have intentionally misused credit will now be discussed with reference to FIGS. 5-9. All of the below-described exemplary consumers exhibit IMOC behavior and would be identified and tagged as IMOC individuals by the IMOC modeling system 110. FIG. 5 provides a table 500 that, in column 504, lists three exemplary individual consumers that have intentionally misused credit and, in columns 508-528, provides six consumer-account types: column 508 represents consumer credit card (CC) accounts; column 512 represents consumer dependant care (DC) accounts; column 516 represents consumer demand deposit (DD) accounts; column 520 represents independent learning (IL) accounts; column 524 represents line-of-credit (LOC); and column 528 represents consumer saving (SAV) accounts. For each of the three exemplary consumers listed in column 504, columns 508a,b-528a,b provide indications of which account types the consumer had before and after booking an SMB account.

The row of table 500 that represents Consumer 1 will now be discussed to illustrate the information provided in table 500. In the row 532 of table 500 that represents Consumer 1, a "1" is provided in the before and after columns for the consumer CC account and the LOC. The "1's" in the before columns 508a, 524a for the CC account and the LOC indicate that Consumer 1 booked the consumer CC account and the LOC before booking an SMB account and the "1's" in the after columns 508b, 524b for consumer CC account and the LOC indicate that Consumer 1 kept the consumer CC account and the LOC after booking the SMB account. Further, in the row 532 that represents Consumer 1, a "1" is provided in the after column 520b for the IL account, thereby indicating that Consumer 1 booked an IL account after booking the SMB account.

Also for illustrative purposes, the row 536 of table 500 that represents Consumer 2 will now be discussed. In the row 536 that represents Consumer 2, a "2" is provided in the before column 508a for the consumer CC account and a "1" is provided in the after column 508b for the consumer CC account. The "2" in column 508a indicates Consumer 2 had two consumer CC accounts before booking an SMB account and the "1" in column 508b indicates Consumer 2 had only one consumer CC account after booking the SMB account. Accordingly, after booking the SMB account, Consumer 2 closed a consumer CC account. Further, a "1" is provided in the after column 512b for the DC account, thereby indicating that Consumer 2 opened a dependent care account after booking the SMB account. With regard to the row 540 that represents Consumer 3, the "1's" in columns 508a-b and 516a-b indicate that Consumer 3 had one consumer CC account and one DD account before and after booking an SMB account.

Table 600 of FIG. 6 is similar to table 500 except, instead of indicating consumers' consumer accounts, table 600 indicates consumers' business accounts. Column 604 lists the same three exemplary individual consumers that are listed in column 504 of table 500. As mentioned above, all of these three exemplary individuals misused credit in the past and are therefore IMOC individuals. Columns 608-616 represent three different types of business accounts: column 608 represents business CC accounts; column 612 represents business DC accounts; and column 616 represents business DD accounts.

As indicated by the "1" in row 632 of column 608b, the "2" in row 636 of column 608b, and the "1" in row 640 of column 608b, all three consumers opened at least one business CC account after booking an SMB account. Further, as described above and as indicated in table 500, all three exemplary consumers had a consumer CC account with the financial institution prior to booking an SMB account. As described in more detail below with reference to FIGS. 7-9, all three of these exemplary IMOC consumers took cash advances against the newly opened business CC accounts and the already-opened consumer CC accounts proximate to the time of booking an SMB account and never repaid the borrowed money.

Figure 7:
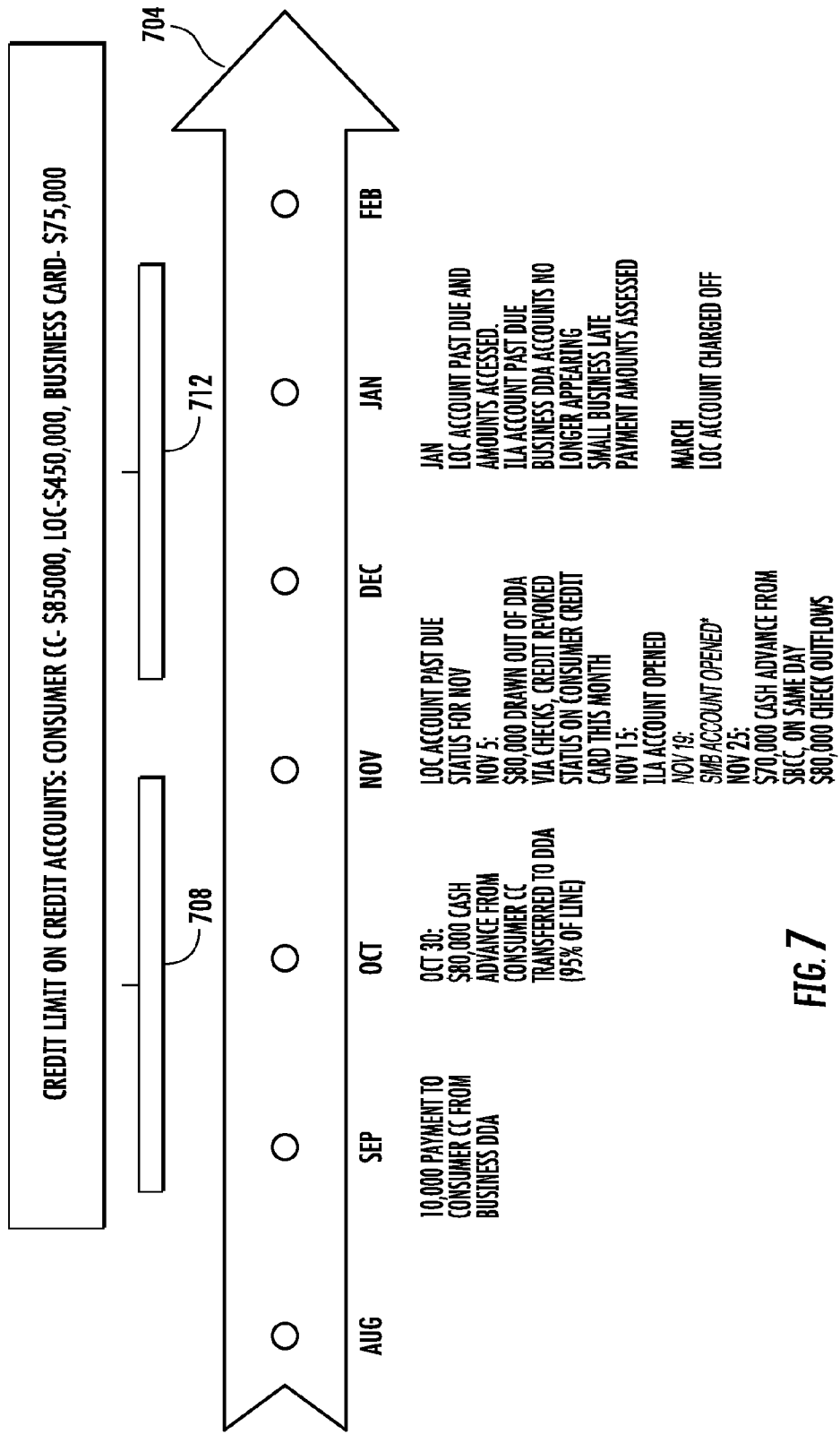
FIG. 7 illustrates a timeline that lists selected transaction data and other information taken from an exemplary IMOC individual's financial-transaction data, cash-flow data, and net-worth data, according to an embodiment of the present invention.

With reference to FIG. 7 as well as FIGS. 5 and 6, Consumer 1's financial transactions will now be discussed in more detail. FIG. 7 illustrates a timeline 704 of financial transactions relative to when Consumer 1 booked an SMB account. The timeline 704 consists of selected portions of Consumer 1's financial-transaction data 152, cash-flow data 154, and net-worth data 156. The "pre-booking" period 708 and "post booking" period 712 represent the period before Consumer 1 booked the SMB account and the period after Consumer 1 booked the SMB account, respectively. As indicated in by timeline 704, the pre-booking period 708 includes the months of August, September, and October, which are the three months prior to booking of the SMB account. Also, as indicated in timeline 704, the post-booking period 712 includes the months of December, January, and February, which are the three months post booking of the SMB account.

As illustrated in the FIGS. 5 and 6, Consumer 1 had a consumer CC account, a home-equity line-of-credit (HE-LOC), and a business DD account during the pre-booking period 708. As provided in FIG. 7, Consumer 1's credit limit was $85,000 for the consumer CC account, $450,000 for the HELOC, and $75,000 for the business CC account. In August, Consumer 1 paid $10,000 to his consumer CC account from his business DD account. On October 30, Consumer 1 took a cash advance of $80,000 against his consumer CC account and transferred that amount to his business DD account. During this October 30th transaction, Consumer 1 utilized 95% of the sanctioned credit limit for his consumer CC account. Later, on November 7th, Consumer 1 withdrew the $80,000 out from his DD account using checks. Then, Consumer 1 opened an individual learning (IL) account on November 15th and an SMB account on November 19th. On November 25th, Consumer 1 took a $70,000 cash advance against his business CC account and withdrew that money using checks. In January, the financial institution indicated that Consumer 1's HELOC, business CC account, consumer CC account, IL account, and SMB account were past due and that the business DD account was been closed out. After February, the financial institution charged-off Consumer 1's HELOC.

As described above, Consumer 1 drew down his lines of credit by taking an $80,000 cash advance against his consumer CC account on October 30th and then a $70,000 cash advance against his business CC account less than one month later. Soon after Consumer 1 took the cash advances and soon after Consumer 1 applied for an SMB account, Consumer 1 stopped making payments on all of his credit accounts and past due assessments began to be imposed by the financial institution. This pattern of taking large cash advances against existing credit, overdue on credit repayments, and past due assessments beginning to accrue proximate to the time Consumer 1 applying for an SMB account indicates that Consumer 1 may be an IMOC individual. That is, it appears Consumer 1 took the $80,000 and $70,000 cash advances with no intention to ever repay the financial institution.

Figure 8:
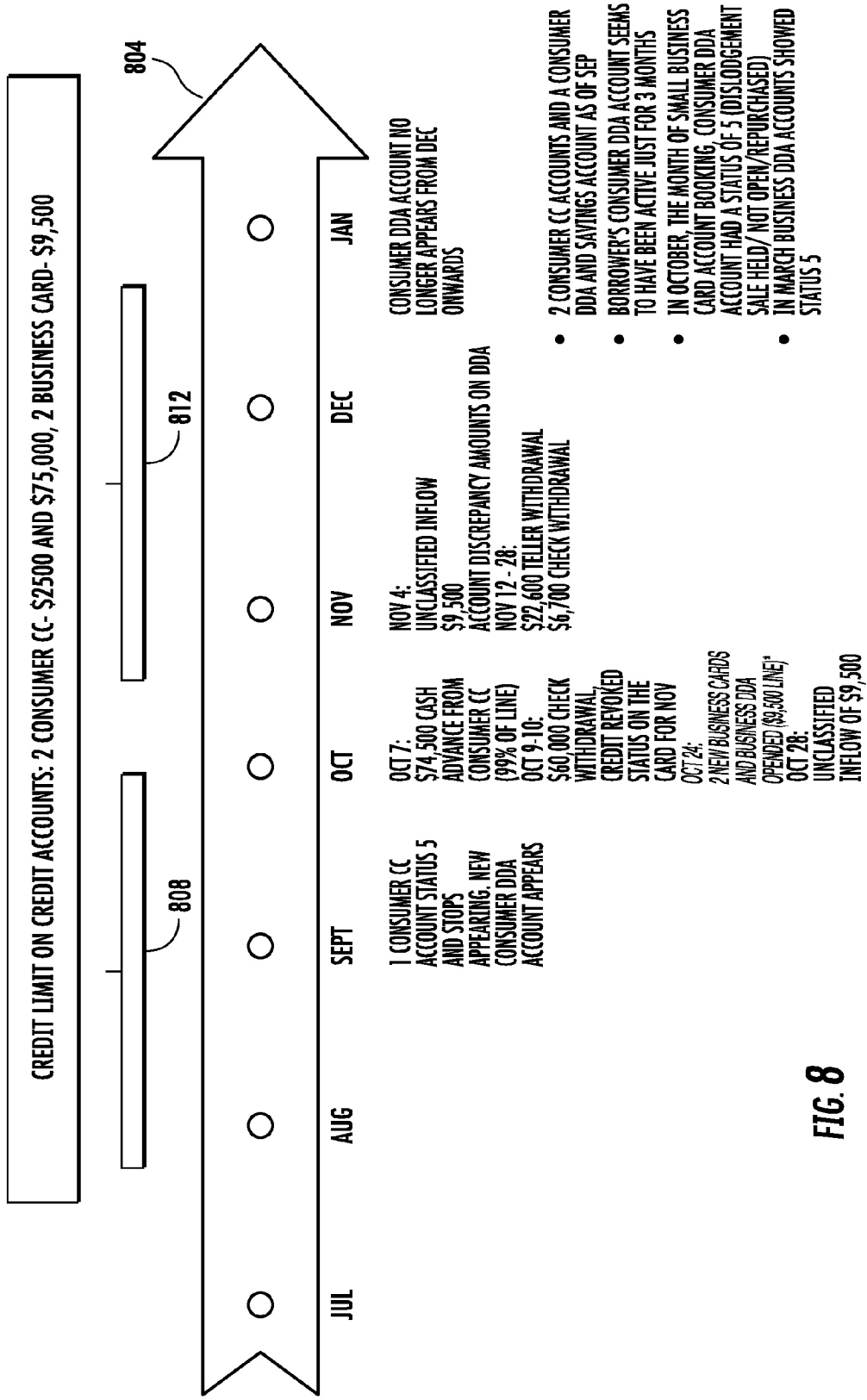
FIG. 8 illustrates another timeline that lists selected transaction data and other information taken from an exemplary IMOC individual's financial-transaction data, cash-flow data, and net-worth data, according to an embodiment of the present invention.

With reference to FIG. 8 as well as FIGS. 5 and 6, Consumer 2's financial transactions will now be discussed in more detail. FIG. 8 illustrates a timeline 804 of financial transactions relative to when Consumer 2 booked an SMB account, which included two new business CC accounts. The timeline 804 consists of selected portions of Consumer 2's financial-transaction data 152, cash-flow data 154, and net-worth data 156. A pre-booking period 808 is designated that includes the months of July, August, and September, which are the three months prior to when Consumer 2 booked the SMB account. Also, as indicated in timeline 804, a post-booking period 812 is designated that includes the months of November, December, January, which are the three months after Consumer 2 booked the SMB account.

As indicated in table 500, Consumer 2 had two consumer CC accounts during the pre-booking period 808, i.e., before booking the SMB account. After booking the SMB account, which included the two the business CC accounts, as indicated by the post-booking period 812 of the timeline 804, Consumer 2 closed one consumer CC account but opened a consumer DC account, a business DC account, and a business DD account. As indicated in FIG. 8, Consumer 2 had a credit limit of $2,500 on a first consumer CC account, $75,000 on a second consumer CC account, and $9,500 on each of the two business CC accounts.

As indicated in the pre-booking period 808, Consumer 2 had a "not open" status on one of his two consumer CC accounts in September. In the same month, Consumer 2 opened a new consumer DD account. Then, on October 7th, Consumer 2 took a $74,500 cash advance against his other consumer CC account. In this transaction, Consumer 2 utilized 99% of the consumer CC account's credit limit. On October 9th and 10th, Consumer 2 withdrew $60,000 of the $74,500 cash advance from his newly opened consumer DD account using checks. On November 4th, a charge of $9,500 was debited against Consumer 2's newly opened consumer DD account and, soon after this charge, the financial institution levied account discrepancy assessments on the consumer DD account. Consumer 2 then took large cash advances against his other credit accounts. From November 12 to November 28, which was soon after the cash advances, Consumer 2 withdrew $22,600 through teller withdrawals and $6,700 through checks from his consumer DD account. From December onwards, Consumer 2's consumer DD account had no activity. Accordingly, Consumer 2's consumer DD account was active for just three months. It would appear that Consumer 2 opened the consumer DD account as a means to withdraw cash advances taken against CC accounts. In October, the financial institution closed Consumer 2's consumer DD account. By March, Consumer 2's business DD account was also inactive.

In sum, Consumer 2 took large cash advances and stopped making repayments proximate to the time he booked the SMB account. This pattern of taking large cash advances against existing credit, overdue on credit repayments, and past due assessments beginning to accrue close in time to applying for SMB account, indicates that Consumer 2 may be an IMOC individual.

Figure 9:
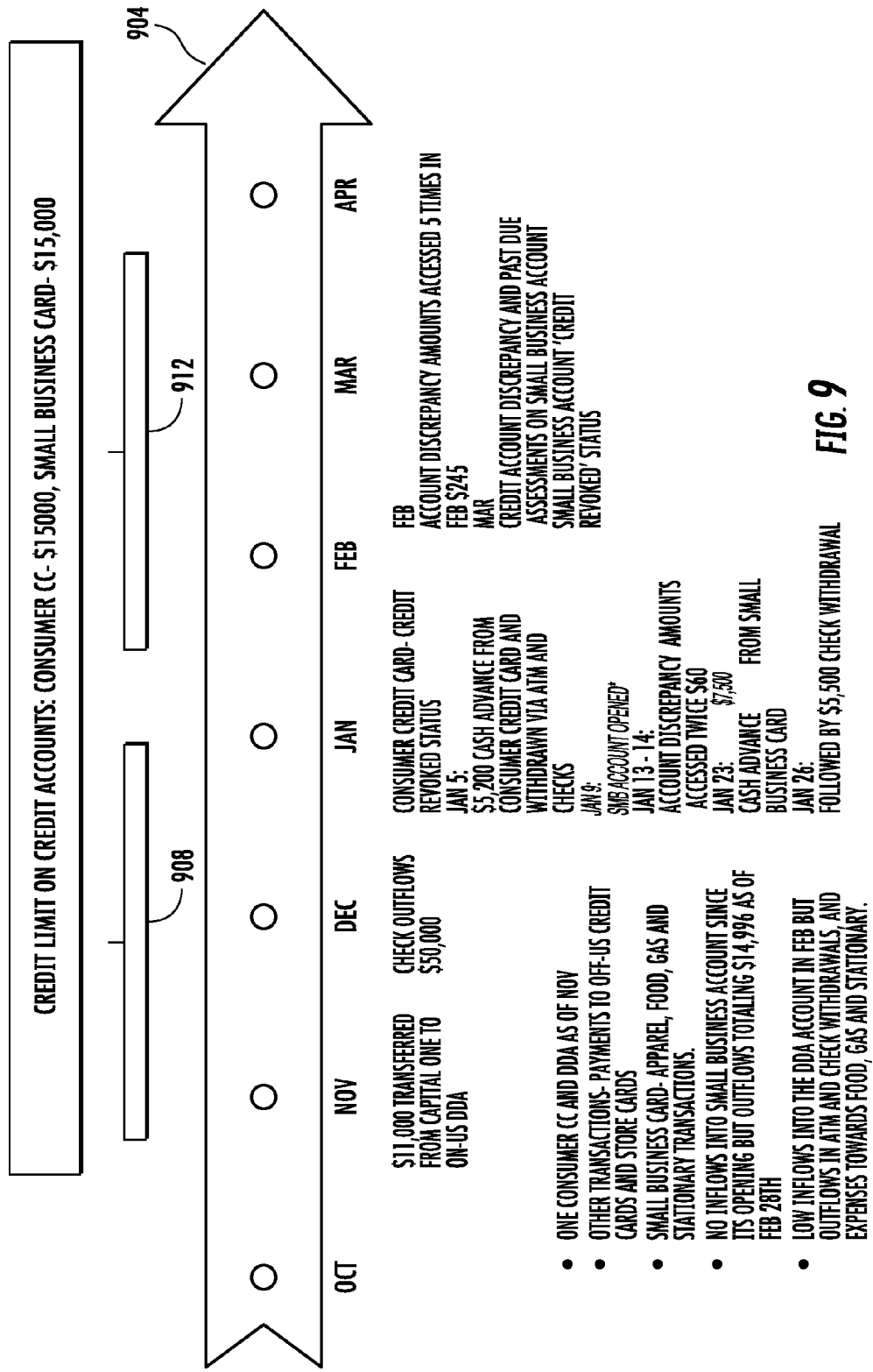
FIG. 9 illustrates yet another timeline that lists selected transaction data and other information taken from an exemplary IMOC individual's financial-transaction data, cash-flow data, and net-worth data, according to an embodiment of the present invention.

Referring now to FIG. 9 as well as FIGS. 5 and 6, Consumer 3's financial transactions will now be discussed in more detail. FIG. 9 illustrates a timeline 904 of financial transactions relative to when Consumer 3 booked an SMB account. The timeline 904 consists of selected portions of Consumer 3's financial-transaction data 152, cash-flow data 154, and net-worth data 156. A pre-booking period 908 is designated that includes the months of October, November, and December, which are the three months prior to when Consumer 3 booked the SMB account in January. Also, as indicated in timeline 904, a post-booking period 912 is designated that includes the months of February, March, April, which are the three months after Consumer 3 booked the SMB account.

As indicated in table 500, Consumer 3 had a consumer CC account and a consumer DD account during the pre-booking period 908, i.e., before booking an SMB account, which included a business CC account. Accordingly, after booking the SMB account, as indicated by the post-booking period 912 of the timeline 904, Consumer 3 had a business CC account. As indicated in FIG. 9, Consumer 3 had a $15,000 credit limit on his consumer CC account and a $15,000 on his business CC account. In November, Consumer 3 transferred $11,000 from another financial institution to the consumer DD account. Then, in December, Consumer 3 used a check to outflow $50,000 from the consumer DD account. In January, Consumer 3 took a $5,200 cash advance against the consumer CC account using ATM withdrawals and check, and the financial institution revoked credit status on the consumer CC account.

On January 9, Consumer 3 opened an SMB account. Just days later, on January 13, the financial institution levied two account discrepancy assessments of $60 on his consumer DD account. On January 23, Consumer 3 took $7,500 cash advance from the business CC account and, on January 26, he took a $5,500 from the business CC account. In February, the financial institution levied a total $245 in account discrepancy assessments against Consumer 3's consumer DD account for five different transactions. The financial institution also charged account discrepancy and past due assessments on Consumer 3's SMB account. Finally in February, the financial institution revoked credit status on the SMB account. Also, Consumer 3 used the business CC account for purchasing personal items, such as apparel, food, gas and stationary. Until February 28th, Consumer 3's SMB account did not show any inflow of money, but showed an outflow of $15,000, which was the entire line of credit. Consumer 3's consumer DD account also showed low inflow of money in month of February, but showed large outflows from ATM and check withdrawals.

The above stated transaction record shows that Consumer 3 had large account discrepancy assessments and past due payments that were levied on his accounts very close to the booking date of his SMB account. Also, proximate to the booking date of the SMB account, Consumer 3 withdrew large sums from his CC accounts and is DD account. Accordingly, Consumer 3's transaction history indicates that he may be an IMOC individual.

Based on the above-discussed transactions of the exemplary consumers who in the past have shown IMOC behavior, the following inferences can be made to identify potential IMOC individuals: (1) prior booking an SMB account, the consumer consistently draws large sums from credit accounts; (2) these cash advances are usually followed by immediate withdrawals via checks and ATM and/or teller withdrawals; (3) the consumer's accounts incur increasing account discrepancy assessments and past due payment assessments that are levied very close to the booking date of the SMB account; and (4) the consumer simultaneously opens other credit products and/or credit accounts.

With the above-discussion of the three exemplary IMOC consumers as context, the discussion of the exemplary process 400 will now resume. As mentioned above, the exemplary process 400 is for identifying and tagging as IMOC individuals those consumers who have intentionally misused credit in the past. After the modeling application 160, as represented by block 408, instructs the processing apparatus 130 to retrieve information about each of the individual consumers who recently opened an SMB account, the modeling application 160, as represented by block 416, instructs the processing apparatus 130 to identify those individual consumers who quickly drew down a large percentage of their available credit proximate to the date they booked an SMB account. For example, the modeling application 160 could instruct the processing apparatus 130 to identify individual consumers who utilized at least seventy percent of their overall credit limit (i.e., the overall credit limit across all credit accounts) within a three-month period that is proximate to the booking date of their SMB account. Also, for example, the modeling application 160 could instruct the processing apparatus 130 to identify individual consumers who utilized at least ninety percent of the credit limit of a single credit account within a three-month period that is proximate to the booking date of their SMB account. Those having skill in the art will appreciate that a number of criteria exist for identifying individual consumers who quickly drew down a large percentage of their available credit proximate to the date they booked an SMB account.

Next, as represented by block 420, the modeling application 160 instructs the processing apparatus 130 to identify those individual consumers whose accounts incurred account discrepancy assessments proximate to the booking date of the SMB account. Then, as represented by block 424, the modeling application 160 instructs the processing apparatus 130 to identify those individual consumers who were overdue on their debt repayment proximate to the booking date of the SMB account. Next, as represented by block 428, the modeling application 160 instructs the processing apparatus 130 to tag IMOC individuals. According to some embodiments, when executing the step represented by block 428, the modeling application 160 instructs the processing apparatus 130 to tag as IMOC individuals those individual consumers: (1) who quickly drew down a large percentage of their available credit proximate to the date they booked an SMB account; (2) whose accounts incurred account discrepancy assessments proximate to the booking date of the SMB account; and (3) who were overdue on their debt repayment proximate to the booking date of the SMB account. It should be appreciated that the modeling application 160 could instruct the processing apparatus 130 to tag as IMOC individuals those individual consumers who meet any one or any two of the above-three requirements.

It should be appreciated that the step of tagging an individual consumer as an IMOC individual, which is represented by block 428, could be incorporated into either of the steps represented by blocks 416, 420, and 424. In this case, for example, the step represented by block 416 would include identifying and tagging as IMOC individuals those consumers who quickly drew down their available credit proximate to booking an SMB account. Similarly, the step represented by block 420 would include identifying and tagging as IMOC individuals those consumers whose accounts incurred account discrepancy assessments proximate to the booking date of the SMB account. Likewise, the step represented by block 424 would include identifying and tagging as IMOC individuals those consumers identify those individual consumers who were overdue on their debt repayment proximate to the booking date of the SMB account. It should also be appreciated that the steps represented by blocks 416, 420 and 424 could be arranged to occur in any order. Further, it should be appreciated that either of the steps represented by blocks 416, 420 and 424 could be removed from the process 400. For example, the step represented by block 420 could be removed from the process 400.

After the IMOC individuals have been tagged, the modeling application 160, as represented by block 432, instructs the processing apparatus 130 to create and store in the memory device 150 a list of the individual consumers who were tagged as IMOC individuals. According to some embodiments, this list is stored in the IMOC-tagged individuals data 158 of the member device 150. The list can be used by the financial institution when making future credit-approval decisions and the list can be sold to other financials institutions. For example, the financial institution could set up a subsidiary company for selling information from the list in the form of a subscription service.

Figure 10:
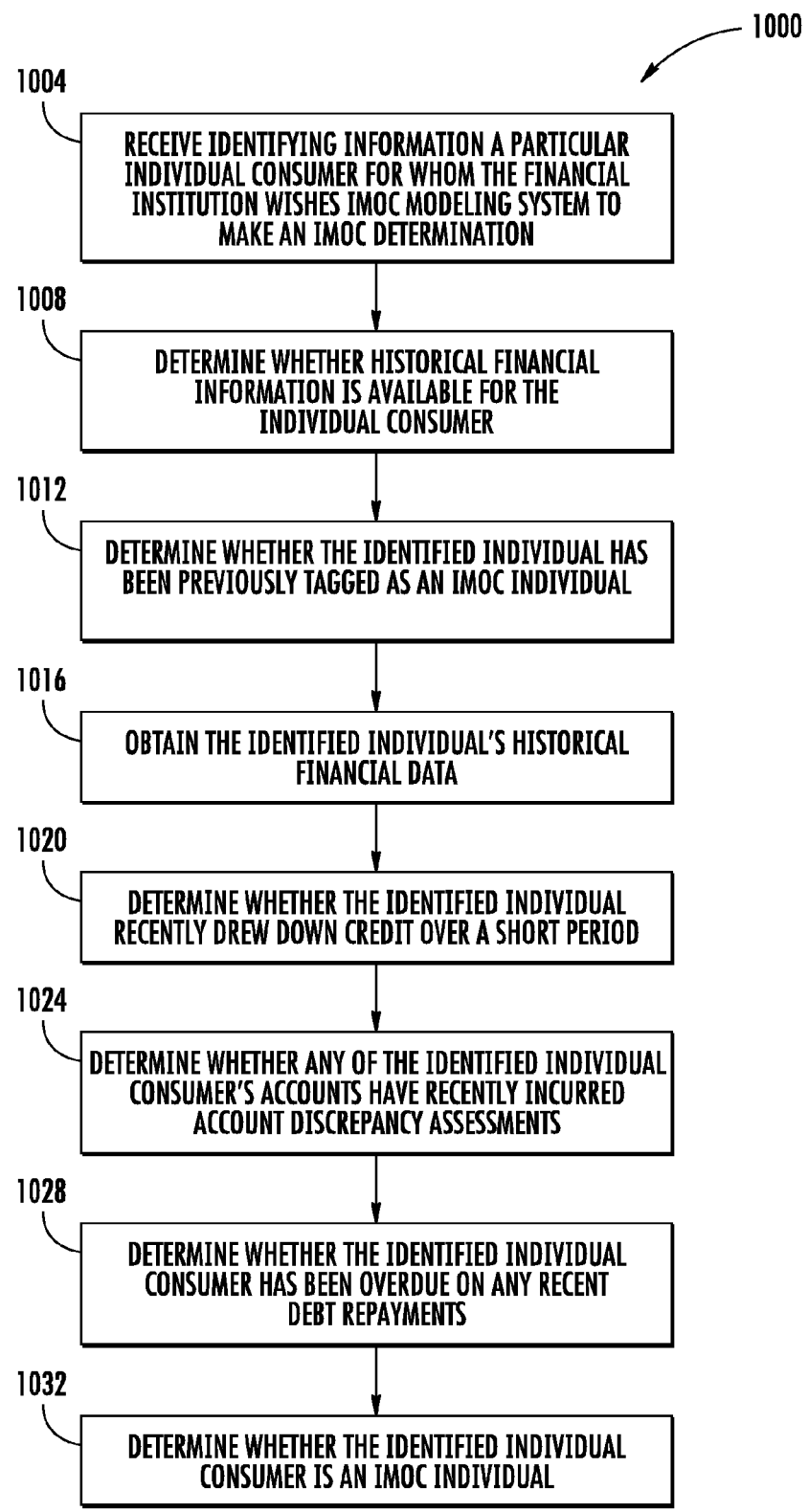
FIG. 10 provides a flow diagram illustrating an exemplary process whereby an organization utilizes the concentration-risk modeling environment of FIG. 1 to identify IMOC individuals, in accordance with an embodiment of the present invention.

Referring now to FIG. 10, a flow diagram is provided that illustrates an exemplary process 1000 whereby a financial institution utilizes the IMOC modeling system 100 of the present invention to determine whether a particular individual consumer is an IMOC individual, in accordance with an embodiment of the present invention. For example, a financial institution may employ the process 1000 when making credit-approval decisions. That is, for example, before approving an individual consumer's application for an SMB account, the financial institution first employs the process 1000 in the IMOC modeling system 110 to determining whether the individual consumer applying for the SMB account has recently exhibited IMOC behavior, which would indicate the consumer possesses the propensity to intentionally misuse the applied-for credit.

As represented by block 1004, according to some embodiments, the IMOC modeling system 110 receives identifying information via the user interface 120 for a particular individual consumer for whom the financial institution wishes IMOC modeling system 100 to make an IMOC determination. In such instances, the modeling application 160 instructs the processing apparatus 130 to receive the identifying information via the user interface 120. As represented by decision block 1008, once the identifying information has been received by the processing apparatus 130, the modeling application 160 instructs the processing apparatus 130 to determine whether the datastores of the memory apparatus 150 contain data that is related to the particular individual consumer identified by the identifying information.

Then, as represented by block 1012, if the memory apparatus 150 does contain data pertaining to the identified individual consumer, then modeling application 160 instructs the processing apparatus 130 to search the IMOC-tagged individuals data 158 to determine whether the identified individual consumer has been previously tagged and listed as an IMOC individual. The modeling application 160 instructs the processing apparatus 130 to display the results of this inquire via the user interface 120 such that the financial institution can consider this information when making its credit-approval decision. Next, as represented by block 1016, the modeling application 160 instructs the processing apparatus 130 to obtain the identified individual consumer's financial-transaction data 152, cash-flow data 154, and net-worth data 156. According to an embodiment, the modeling application 160 instructs the processing apparatus 130 to locate and obtain financial-transaction data 152, cash-flow data 154, and net-worth data 156 for the previous three months. In some embodiments, the financial-transaction data 152 include data from the day before, or even the day of, the inquiry date, which in some cases is the date the individual applied for the credit.

Next, as represented by block 1020, the modeling application 160 instructs the processing apparatus 130 to review the three months of financial-transaction data 152, cash-flow data 154, and net-worth data 156 to determine whether the identified individual consumer recently drew down a large percentage of his available credit over a short period of time. Then, as represented by block 1024, the modeling application 160 instructs the processing apparatus 130 to determine whether any of the identified individual consumer's accounts have recently been subject to account discrepancy assessments. Next, as represented by block 1028, the modeling application 160 instructs the processing apparatus 130 to determine whether the identified individual consumer has been overdue on recent debt repayment.

Next, as represented by block 1032, the modeling application 160 instructs the processing apparatus 130 to determine whether the identified individual consumer is an IMOC individual. For example, according to some embodiments, the modeling application 160 instructs the processing apparatus 130 to determine that the identified individual consumer is an IMOC individual if identified individual consumer (1) recently drew down a large percentage of their available credit over a short period; (2) has an account that recently incurred account discrepancy assessments; and (3) has been overdue on a recent debt repayment. It should be appreciated that the modeling application 160 could instruct the processing apparatus 130 to determine that an identified individual consumer is an IMOC individual if that individual meets any one or any two of the above-three criteria. After the determination is made, the modeling application 160 instructs the processing apparatus 130 to display the result via the user interface 120 such that the financial institution can consider this information when making its credit-approval decision.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for reviewing a plurality of financial-transaction data across a plurality of individual consumers to identify the individual consumers who have intentionally misused credit in the past, the system comprising:
   a user interface;
   a memory device comprising:
   computer-readable program code;
   financial-transaction data for each of the individual consumers; and
   a computing device processor operatively coupled to the user interface and the memory device and configured to execute the computer-readable program code to:
      locate in the memory device financial-transaction data for each of the individual consumers;
      utilize the financial-transaction data to identify the individual consumers who quickly drew down a large percentage of a credit limit proximate in time to a date when the individual consumer booked a credit product;
      utilize the financial-transaction data to identify the individual consumers who were associated with a credit account that incurred an account discrepancy assessment proximate in time to a date when the individual consumer booked a credit product; and
      utilize the financial-transaction data to identify the individual consumers who were overdue on debit repayment proximate in time to a date when the individual consumer booked a credit product.

2. The system of claim 1, wherein the processor is further configured to execute the computer-readable program code to:
   identify as a consumer who has intentionally misused credit in the past each individual consumer whose financial-transaction data indicates that:
   the individual consumer quickly drew down a large percentage of a credit limit proximate in time to a date when the individual consumer booked a credit product;
   the individual consumer was associated with a credit account that incurred an account discrepancy assessment proximate in time to a date when the individual consumer booked a credit product; and
   the individual consumer was overdue on debit repayment proximate in time to a date when the individual consumer booked a credit product.

3. The system of claim 2, wherein the processor is further configured to execute the computer-program code to create a list of the consumers who were identified has having misused credit in the past.

4. The system of claim 2, wherein the processor is further configured to execute the computer-program code to receive, via the user interface, a command to identify the individual consumers who have intentionally misused credit in the past.

5. The system of claim 2, wherein the memory device further comprises:
   cash-flow data for each of the individual consumers; and
   net-worth data for each of the individual consumers.

6. A method for identifying individual consumers who have intentionally misused credit in the past, the method comprising:
   storing, in a memory device, financial-transaction data for each of a plurality of individual consumers; and
   providing a non-transitory computer-readable medium comprising computer program code stored thereon, wherein said computer program code is specifically configured to cause one or more computer processing devices to perform the following operations when performing the computer program code:

utilizing the financial-transaction data to identify the individual consumers who quickly drew down a large percentage of a credit limit proximate in time to a date when the individual consumer booked a credit product;

utilizing the financial-transaction data to identify the individual consumers who were associated with a credit account that incurred an account discrepancy assessment proximate in time to a date when the individual consumer booked a credit product; and utilizing the financial-transaction data to identify the individual consumers who were overdue on debit repayment proximate in time to a date when the individual consumer booked a credit product.

7. The method of claim 6, further comprising:

identifying as a consumer who has intentionally misused credit in the past each individual consumer whose financial-transaction data indicates that:

the individual consumer quickly drew down a large percentage of a credit limit proximate in time to a date when the individual consumer booked a credit product;

the individual consumer was associated with a credit account that incurred an account discrepancy assessment proximate in time to a date when the individual consumer booked a credit product; and the individual consumer was overdue on debit repayment proximate in time to a date when the individual consumer booked a credit product.

8. The method of claim 7, further comprising:

creating a list of the consumers who were identified has having misused credit in the past.

9. The method of claim 7, further comprising:

receiving, via a user interface, a command to identify the individual consumers who have intentionally misused credit in the past.

10. The method of claim 7, further comprising:

storing cash-flow data for each of the individual consumers; and storing net-worth data for each of the individual consumers.

11. A computer program product for identifying individual consumers who have intentionally misused credit in the past, the computer program product comprising a non-transitory computer-readable storage medium having computer-readable program code stored therein, wherein the computer-readable program code comprises:

a first code portion configured to store financial-transaction data for each of a plurality of individual consumers;

a second code portion configured to utilize the financial-transaction data to identify the individual consumers who quickly drew down a large percentage of a credit limit proximate in time to a date when the individual consumer booked a credit product;

a third code portion configured to utilize the financial-transaction data to identify the individual consumers who were associated with a credit account that incurred an overdraft fee account discrepancy assessment proximate in time to a date when the individual consumer booked a credit product;

a fourth code portion configured to utilize the financial-transaction data to identify the individual consumers who were overdue on debit repayment proximate in time to a date when the individual consumer booked a credit product;

a fifth code portion configured to identify as a consumer who has intentionally misused credit in the past each individual consumer whose financial-transaction data indicates that:

the individual consumer quickly drew down a large percentage of a credit limit proximate in time to a date when the individual consumer booked a credit product;

the individual consumer was associated with a credit account that incurred an account discrepancy assessment proximate in time to a date when the individual consumer booked a credit product; and the individual consumer was overdue on debit repayment proximate in time to a date when the individual consumer booked a credit product.

12. The computer program product of claim 11, further comprising:

a code portion configure to create a list of the consumers who were identified has having misused credit in the past.

13. The computer program product of claim 12, further comprising:

a code portion configure to receive, via a user interface, a command to identify the individual consumers who have intentionally misused credit in the past.

14. The computer program product of claim 12, further comprising:

a code portion configure to store cash-flow data for each of the individual consumers;

and a code portion configure to store net-worth data for each of the individual consumers.

15. A system for determining whether a particular individual consumer who is applying for a credit product will likely intentionally misuse the applied-for credit product, the system comprising:

a user interface;

a memory device comprising:

computer-readable program code;

financial-transaction data for a plurality of individual consumers; and a processor operatively coupled to the user interface and the memory device and configured to execute the computer-readable program code to:

receive, via the user interface, identifying information comprising an identification of the individual consumer who is applying for the applied-for credit product;

utilize the financial-transaction data to determine whether the individual consumer quickly drew down a large percentage of a credit limit proximate in time to the date when the individual consumer applied for the applied-for credit product;

utilize the financial-transaction data to determine whether the individual consumer is associated with a credit account that incurred an account discrepancy assessment proximate in time to the date when the individual consumer applied for the applied-for credit product;

utilize the financial-transaction data to determine whether the individual consumer was overdue on debit repayment proximate in time to the date when the individual consumer applied for the applied-for credit product; and indicate that the individual consumer will likely intentionally misuse the credit product if the individual consumer's financial-transaction data indicates that:

the individual consumer quickly drew down a large percentage of a credit limit proximate in time to the date when the individual consumer applied for the applied-for credit product;

the individual consumer was associated with a credit account that incurred an account discrepancy assessment proximate in time to the date when the individual consumer applied for the applied-for credit product; and the individual consumer was overdue on debit repayment proximate in time to the date when the individual consumer applied for the applied-for credit product.

16. The system of claim 15, wherein the processor is further configured to execute the computer-program code to add the individual to a list of the consumers who were identified has having misused credit in the past if it is determined that the individual consumer will likely intentionally misuse the applied-for credit product.

17. The system of claim 15, wherein the memory device further comprises:
cash-flow data for each of the individual consumers; and
net-worth data for each of the individual consumers.

18. A method for determining whether a particular individual consumer who is applying for a credit product will likely intentionally misuse the applied-for credit product, the method comprising:
storing, in a memory device, financial-transaction data for a plurality of individual consumers;
providing a non-transitory computer-readable medium comprising computer program code stored thereon, wherein said computer program code is specifically configured to cause one or more computer processing devices to perform the following operations when performing the computer program code:
receiving identifying information comprising an identification of the individual consumer who is applying for the applied-for credit product;
utilizing the financial-transaction data to determine whether the individual consumer quickly drew down a large percentage of a credit limit proximate in time to the date when the individual consumer applied for the applied-for credit product;
utilizing the financial-transaction data to determine whether the individual consumer is associated with a credit account that incurred an account discrepancy assessment proximate in time to the date when the individual consumer applied for the applied-for credit product;
utilizing the financial-transaction data to determine whether the individual consumer was overdue on debit repayment proximate in time to the date when the individual consumer applied for the applied-for credit product; and
indicating that the individual consumer will likely intentionally misuse the credit product if the individual consumer's financial-transaction data indicates that:
the individual consumer quickly drew down a large percentage of a credit limit proximate in time to the date when the individual consumer applied for the applied-for credit product;
the individual consumer was associated with a credit account that incurred an account discrepancy assessment proximate in time to the date when the individual consumer applied for the applied-for credit product; and
the individual consumer was overdue on debit repayment proximate in time to the date when the individual consumer applied for the applied-for credit product.

19. The method of claim 18, further comprising:
adding the individual to a list of the consumers who were identified has having misused credit in the past if it is determined that the individual consumer will likely intentionally misuse the applied-for credit product.

20. The method of claim 18, further comprising:
storing cash-flow data for each of the individual consumers; and
storing net-worth data for each of the individual consumers.

* * * * *